Oct. 10, 1944.     E. A. ZEMPEL     2,359,957
TOOL MOUNTING ATTACHMENT FOR BORING BARS
Filed April 21, 1943

INVENTOR
EDWARD A. ZEMPEL
BY
Wheeler, Wheeler & Wheeler
ATTORNEYS.

Patented Oct. 10, 1944

2,359,957

UNITED STATES PATENT OFFICE 2,359,957

TOOL MOUNTING ATTACHMENT FOR BORING BARS

Edward A. Zempel, Milwaukee, Wis., assignor to J. M. Nash Company, Milwaukee, Wis., a corporation of Wisconsin Application April 21, 1943, Serial No. 483,854

3 Claims. (Cl. 77—58)

This invention is an improvement in tool mounting attachments for boring bars.

My object is to provide means whereby fragments of stellite, tungsten carbide, or equivalent materials, may be prepared for use as cutting tools by a simple grinding operation and securely and accurately positioned with reference to a boring bar for accurate boring operations.

A further object is to provide means whereby a greater proportion of ordinary cutters composed of such materials may be utilized.

Various attempts have heretofore been made to reduce the waste of such expensive cutting materials by interlocking them with a holder or carrier slide, but, so far as I am aware, such attempts have not met with commercial success due to the expense of preparing the cutters for connection with the holder, and the difficulties encountered in holding such small fragments in place with the necessary rigidity and precision required for accurate boring.

Therefore, a specific object is to provide a mounting assembly for boring bar cutters which includes a tool feeding slide of such form that fragments of cutting material may be prepared for engagement therewith by a simple, inexpensive grinding operation and rigidly secured to the holder by a wedging operation under pressure of an ordinary set screw. This invention is an improvement on that disclosed in my former patent for a Boring bar, Serial No. 2,282,919, dated May 12, 1942.

In the drawing.

Like parts are identified by the same reference characters throughout the several views.

Figure 1:
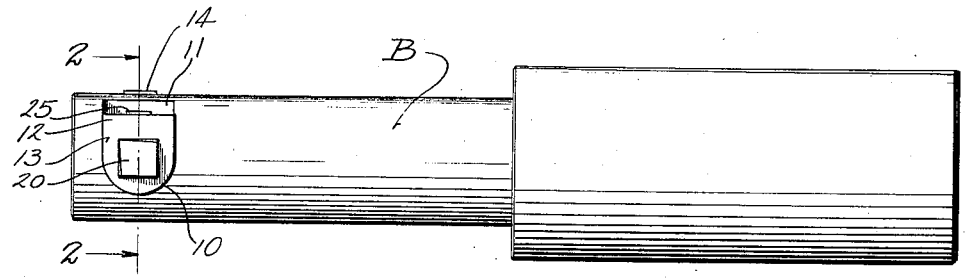
Figure 1 is a view of a standard boring bar to which my attachment has been applied.

The boring bar B is cross bored at 10 near its working end and has a notch 11' at one end of the cross bore. One wall of the notch is in a plane normal to the axis of the bore and forms a shoulder 11 against which a laterally offset portion 12 of a mounting member 13 may be drawn and rigidly secured by operation of a set screw 14. The inner end of the set screw 14 seats against the oblique face or wall 15 of a notch formed in the mounting member 13, said wall being inclined in the direction of the axis of the holder and also in the direction of the plane occupied by the shoulder 11.

The pressure of the set screw 14 upon the oblique surface 15 draws said extension 12 forcibly against the shoulder 11.

The mounting member 13 has an axial aperture 16 which is rectangular in cross section. A slide 17, also of rectangular cross section, is fitted to the aperture 16 and has at one end an open hook 18 having a flat, obliquely disposed inner face which is adapted to slidingly interlock with a reversely formed hook 19 or counterpart portion of the inner end of a cutting tool 20. This connection may be aptly termed a semi-dove tailed interlock.

The inner end of the cutting tool 20 may be shaped to fit the extension 18 of the slide by a simple grinding operation, and the oblique faces of the mutually engaging hook members may be forced together with a wedging action under pressure of a set screw 25 (Figure 2), threaded into an aperture in the laterally offset portion 12.

The cutter tool is thus rigidly interlocked with the slide and has its inner end forcibly held against the end of the slide by the wedging action of its oblique surface 24 upon the face 23 of the slide extension. The flat surfaces 23 and 24 may have a width equal to that of the slide.

The opposite end of the slide is provided with a threaded socket to receive a micrometer screw 28, the head of which has an annular flange 29 in swivelling relation to the associated end of the mounting. The head of the screw also has an exposed calibrated portion 30. To hold the flange 29 to the end of the mounting, this portion of the mounting is provided with a jacket 32 having an inturned end flange 33 in retaining relation to the flange 29. After threading the micrometer screw into the slide 17 the jacket is applied and secured to the mounting by connecting dowel pins 35 which extend through the jacket and are socketed in the mounting as best shown in Figure 3.

Figures 2, 3:
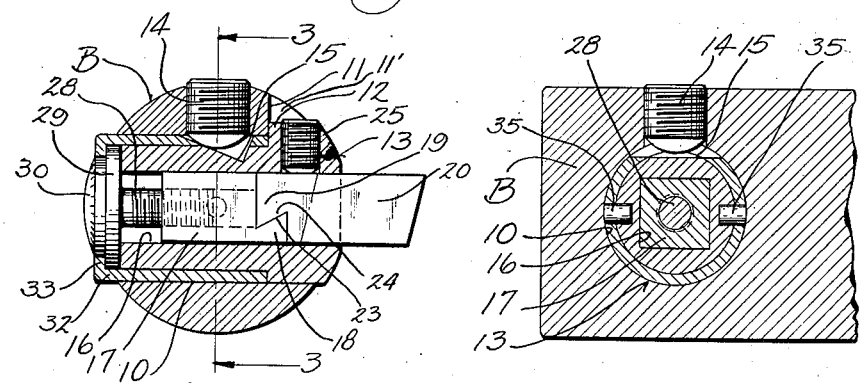
Figure 2 is a vertical sectional view taken on line 2—2 of Figure 1.
Figure 3 is a sectional view taken on line 3—3 of Figure 2.
Figure 4:
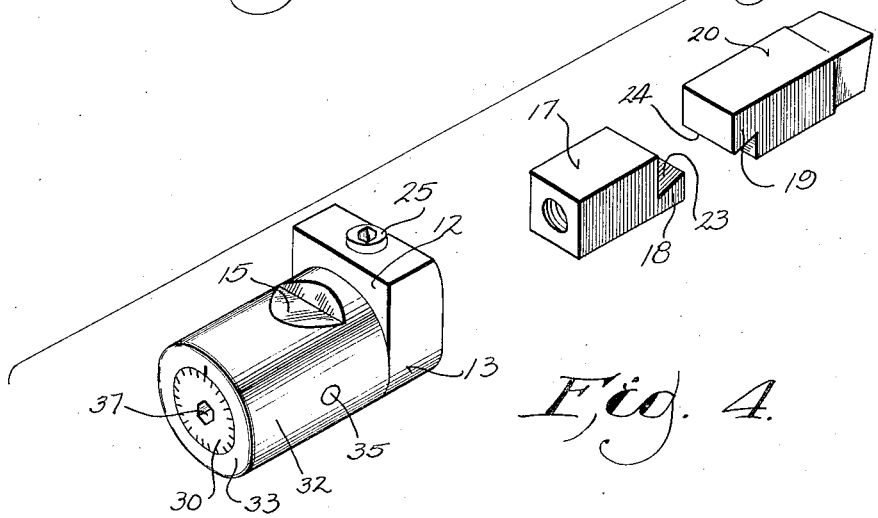
Figure 4 is a view of the mounting, with the parts separated, and shown in perspective.

In the drawing, the cutter tool 20 may be assumed to be of factory predetermined length, and in Figure 2 it is illustrated in an abnormally extended position, from which it may be retracted by loosening the set screw 25 and then rotating the micrometer screw 28 to retract the slide and cutter.

As the working end of the cutter wears away, it may be progressively advanced and re-ground until the set screw 25 engages its extreme inner end, the cutter having been thus worn away substantially to the extent indicated by the dotted line thereon in Figure 2.

Due to its rectangular cross section, the cutter cannot turn in the mounting, and therefore in all positions of adjustment the set screw 25 will force its inner end against the associated end of the slide under the wedging action of the oblique surfaces 23 and 24, while also binding it to the wall of the mounting aperture on the side opposite that occupied by the set screw. Therefore the cutter and the slide will be held together with substantially the same rigidity as if integrally formed. Both of the set screws 14 and 25, as well as the calibrated head 30 of the micrometer screw, are provided with suitable sockets 37 to receive any ordinary wrench adapted to fit such a socket.

I claim:

1. A mounting for boring bar cutters, comprising the combination of a suitable body having an axial aperture of rectangular cross section, a slide adjustably mounted in said aperture, a cutter tool also mounted in said aperture, said slide and cutter having mutually engaging hook-shaped portions provided with flat contacting faces in a plane oblique to the axes of the slide and cutter, and a set screw threaded in said mounting in a position to force said flat surfaces of the slide and cutter together with a wedging action, whereby the cutter may be rigidly and precisely held to the mounting in each position of readjustment to compensate for wear until all but its hook-shaped portion has been worn away.

2. The combination with a boring bar provided with a cross bore near its working end and having a notch at one end of the cross bore, of a tool mounting adapted to enter said cross bore and provided with a lateral shoulder adapted to seat in said notch, a set screw adapted to force said shoulder into binding engagement with one wall of the boring bar notch, said mounting having an axially extending aperture of rectangular cross section, a slide of like cross section fitted to said aperture, an adjusting screw, axially threaded in said slide and having a head flange in swivelling engagement with one end of the mounting, a mounting jacket holding the flange in said swivelling relation and a cutter also fitting said aperture, said cutter and slide having mutually engaging flat faces in an oblique plane, and the mounting having a set screw adapted to force said flat faces together with a wedging action to rigidly secure the cutter to the slide in precise predetermined relation thereto in various positions of cutter adjustment.

3. The combination with a boring bar provided with a cross bore near its working end, a tool mounting adapted to be received in the cross bore and having a laterally extending shoulder portion adapted to engage the bar, set screw means for holding said shouldered portion in binding engagement with the boring bar, a slide supported for axial adjustment in the mounting and held against rotation therein, an adjusting screw axially threaded in said slide and having a calibrated head, means for holding said head in swivelling relation to the mounting, and a cutter adapted to be carried by the mounting and interlocked with said slide, said cutter and slide having their interlocking ends ground to provide mutually engaging flat surfaces in an oblique plane inclined in the direction of the slide, and a set screw carried by the mounting and adapted to force said flat surfaces together in various positions of slide adjustment, whereby fragments of cutting material may be prepared for association with the slide by a single grinding operation and held to the slide with perfect rigidity and precision.

EDWARD A. ZEMPEL.